Aug. 11, 1959     R. MICEK     2,899,003
TOOL
Filed Oct. 26, 1956
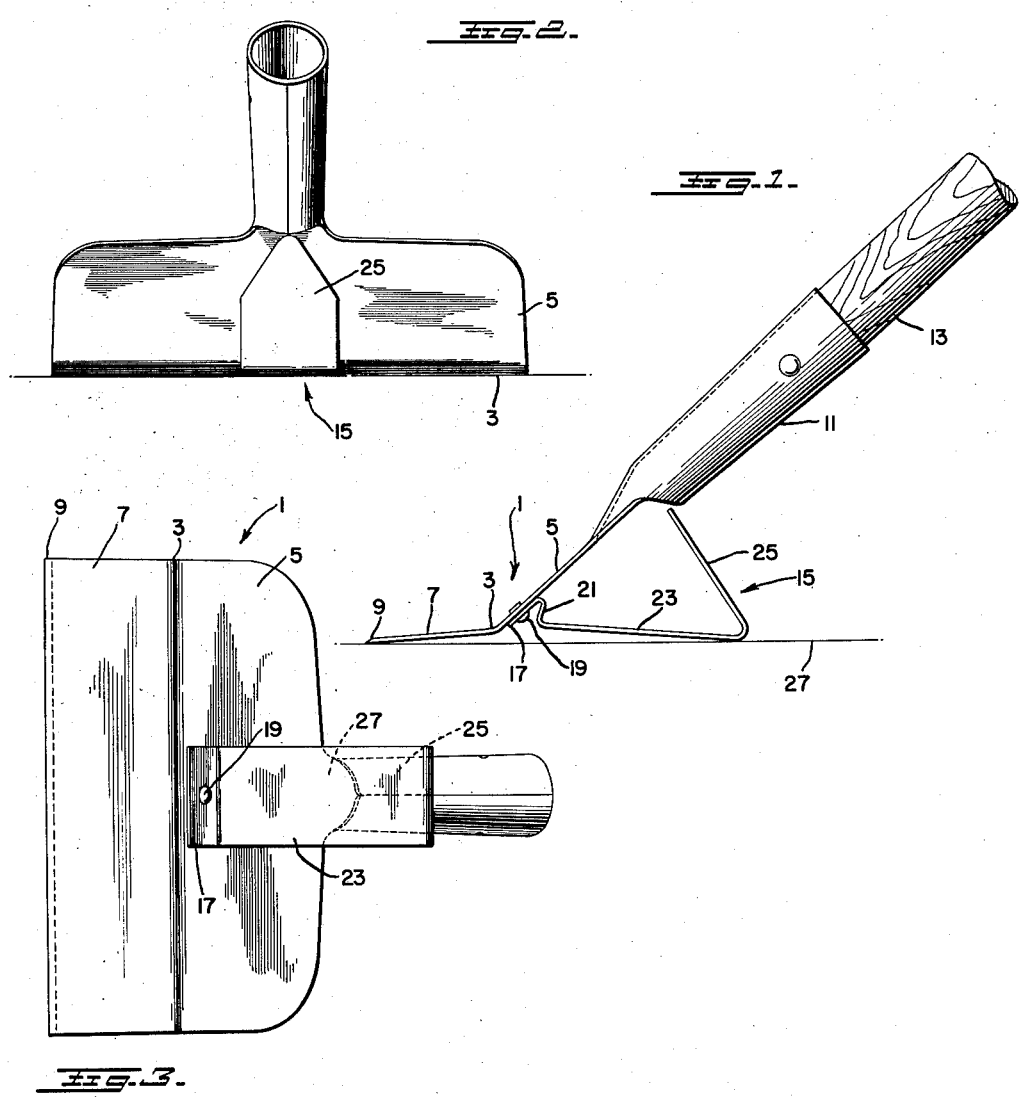
INVENTOR
Richard Micek
BY Peck & Peck
ATTORNEY

2,899,003
TOOL

Richard Micek, Walsenburg, Colo.

Application October 26, 1956, Serial No. 618,620

1 Claim. (Cl. 172—371)

This invention relates broadly to the art of hand manipulable tools and in its more specific aspects it relates to a tool which has been especially designed for removing weeds and other undesirable growth from lawns, gardens, and around plants and the like; and the nature and objects of the invention will be readily recognized and understood by those skilled in the art to which it relates in the light of the following explanation and detailed description of the accompanying drawings illustrating what I at present believe to be the preferred embodiment or mechanical expressions of my invention from among various other forms, arrangements, combinations and constructions, of which the invention is capable within the spirit and scope thereof.

Many tools have been devised for removing weeds and the like undesired growth from lawns, gardens and other ground surfaces, however those of which I am aware are not fully satisfactory for a variety of reasons. Many of them are in the nature of a hoe and when used in the weeding operation gouge out the ground in removing the weed and thus leave the lawn or other ground surface in an uneven and unsightly condition. It is desirable in a tool of this character to provide some means so that the roots of the weed will be removed as well as the growth portion thereof and it is, of course, desirable that this be accomplished without leaving the aforementioned holes in the ground. In order to provide a hand manipulable tool of simple construction and ease of operation I have formed on the tool means which gauge the depth of the cut and thereby provide a uniform cutting operation and one which does not leave the ground full of unsightly and undesirable holes.

In devising a satisfactory tool of the character with which I am concerned it was necessary to so construct, arrange and dispose the blade relative to the gauging means that the latter would function and be effective in its gauging operation regardless of the number of times the blade is sharpened. It will be recognized that the blades of these tools must be sharpened in order for the tool to function properly and hence it is necessary that the gauging means be of such character that the sharpening, and the resulting reduced length of the blade, will not upset the gauging means and the tool will continue cutting to a uniform depth.

It has also been one of my purposes to provide a tool which is economical to produce and which is endowed with long life characteristics. I have evolved a tool which may be manufactured by, for instance, a punch press method in such a manner that material which would normally be wasted is used and forms one of the critical parts of the tool.

One form of my garden tool is of particularly simple and economical construction and is formed of a single piece of material which is formed by bending or the like not only to form the blade but also the gauging means whereby a uniform cut is assured in the weeding operation.

If a tool of this general character is to be practical and useful in serving the function for which designed it must be easy and simple to use. These qualifications are inherent in the construction of my tool and because of its unique design it is easy to push along the ground and will automatically cut the weeds at a uniform depth.

While I shall describe the tool of this invention as a garden or weeding tool it is within my contemplation that it may, without change, be just as successfully used in the removal of shingles from a roof or the removal of worn floor covering such as linoleum and the like, and for a variety of other uses in the nature of "scraping uses."

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

Fig. 1 is a side view in elevation of the tool.

Fig. 2 is a rear view in elevation of the tool.

Fig. 3 is a bottom plan view of the tool.

In the accompanying drawing and particularly Figs. 1 through 3 thereof I have disclosed one form of my hand manipulable tool which is provided with what I shall term an "angled plate member" which I have designated in its entirety by the numeral 1. This angled plate member may be made of any suitable metal or other material of a gauge sufficient to provide the necessary rigidity to the member. The angled plate member 1 is bent transversely through the approximate center thereof as at 3 to thereby form an upper body section 5 and a blade section 7. The included angle formed by sections 5 and 7 may be on the order of 45 degrees. The forward edge of the blade section 7 is provided with a sharpened edge 9 which, as will become apparent as this description proceeds, is adapted to cut and uproot the weeds at a point slightly below the surface of the ground. The blade section 7 is at least one inch and preferably longer in the dimension from the cutting edge rearwardly to the bend 3 in the angled plate member so that the forward cutting edge 9 may be sharpened a plurality of times without detracting from the operativeness of the tool, all as will be explained hereinafter.

A handle receiving ferrule is formed to extend upwardly from the body section 5 of the angled plate section and a wooden or other suitable handle 13 may be fixed in the ferrule. The ferrule may be formed as an integral appendage of the angled plate section 1 or it may be a separate element affixed thereto in any suitable manner.

I have used the reference numeral 15 to designate the gauging means for my tool and this consists of a heel-like member which is affixed to the underside of the body plate 5 to extend rearwardly therefrom in a manner to be described. The gauging means or heel-like member 15 is provided with an affixing portion 17 which is maintained in abutting relationship with the underside of the body plate 5 by means of a rivet or the like 19, or the section 17 may be affixed to the body plate in any other suitable and desirable manner. The gauging means which is preferably formed of metal having a degree of flexibility and of generally strip-like form is provided with a downward bent section 21 which extends from the upper end of section 17, and at its lower end is again bent to provide a rearwardly extending ground or other surface engaging shoe portion 23. At the rear end of the shoe portion 23 the gauging means 15 may be formed with a further bend providing an upwardly and forwardly extending section 25 which extends forwardly and upwardly to a point below the open end 27 of the ferrule 11. Consideration of the drawings clearly indicates that the shoe section 23 of the gauging means extends rearwardly and downwardly from the section 21 so that it is in inclined position relative to the ground or other surface 27, and it will further be evident from consideration of the drawings that the included angle formed by the blade section 7 and the shoe 23 is less than 180° but is greater than 90° so that when the tool is new and has had only one sharpening operation of the edge 9 the blade section will not extend parallel with the ground or other surface but instead will extend upwardly and rearwardly therefrom at an inclination to the ground while the shoe section 23 will engage the ground adjacent its rear end and will extend from said rear end forwardly and upwardly. Now as the cutting edge is sharpened the blade section will continue to be inclined relative to the ground but shoe 23 will progressively assume a smaller angle of inclination relative to the ground. Thus regardless of the grinding away of the blade the uniform cut will be maintained.

It will now be realized that by this unique construction I have provided an arrangement whereby the blade may be sharpened a plurality of tiimes and because of the inclination of the shoe 23 and of the blade section the cutting edge of the blade will always be in contact with the ground and the blade section will maintain the desired angular relationship with respect to the ground or other surface no matter how shortened the blade 7 becomes due to continued sharpening of its cutting edge. Thus, it is this relative positioning of the gauging means 15 with respect to the body section 5 and the blade section 7 that produces this highly desirable result and effects cutting of weeds or other material to the proper depth regardless of the shortened length of the blade due to sharpening. It will also be apparent that the use of the implement due to the certain inherent springiness in the gauging means 15 may by varying the pressure on the handle 13 somewhat vary the cutting action of the implement.

It will now be apparent that I have evolved a unique tool construction which is especially designed for weeding purposes but may be equally well used for other purposes, and which will provide uniform cutting even after many sharpenings and which provides certain economies in manufacture and is easy to use.

I claim:

A cutting tool adapted to be pushed along the ground or like surface, comprising an angled plate member including a blade section provided with a cutting edge along its forward end and capable of being sharpened a plurality of times, and a body section extending upwardly and rearwardly from the rearward end of said blade section, a ferrule for a handle extending rearwardly and upwardly from the rear edge of said body section, and means connected with said angled plate member for limiting and making uniform the depth of the cut of said cutting edge regardless of the changes in length of the blade caused by sharpening, said means being formed of bendable material and including a shoe portion having a section bent from the rear end thereof and extending upwardly and forwardly therefrom to a point adjacent to but spaced from said ferrule and having a further section bent from the forward end thereof and extending to and affixed to said body section of the angled plate member, said shoe having a rear portion thereof in engagement with the ground or like surface and the remaining portion of said shoe extending forwardly and upwardly from said rear portion at an inclination to the ground or like surface, said shoe portion and said blade section being angularly related so that said forward portion of the blade section will continue to contact the ground after a plurality of sharpenings with said cutting edge being maintained in contact with the ground or like surface by said means and the blade section extending upwardly and rearwardly from said cutting edge at an inclination to the ground or like surface.

References Cited in the file of this patent

UNITED STATES PATENTS

| | | |
|---|---|---|
| 1,553,151 | Edwards | Sept. 8, 1925 |
| 1,998,314 | Gilstrap et al. | Apr. 16, 1935 |
| 2,017,436 | Gebhardt | Oct. 15, 1935 |
| 2,489,606 | Allen | Nov. 29, 1949 |
| 2,734,291 | Lasker | Feb. 14, 1956 |
| 2,769,236 | Phillips et al. | Nov. 6, 1956 |
| 2,769,385 | Hahn | Nov. 6, 1956 |

FOREIGN PATENTS

| | | |
|---|---|---|
| 454,906 | Canada | Mar. 8, 1949 |
| 45,434 | Denmark | Mar. 21, 1932 |